(12) United States Patent
Zhang et al.

(10) Patent No.: US 7,400,118 B1
(45) Date of Patent: Jul. 15, 2008

(54) HIGH EFFICIENCY SINGLE-INDUCTOR DUAL-CONTROL LOOP POWER CONVERTER

(75) Inventors: Zhiye Zhang, San Jose, CA (US); Yu-Cheng Chang, Cupertino, CA (US)

(73) Assignee: Alpha & Omega Semiconductor, Ltd., Hamilton (BM)

( * ) Notice: Subject to any disclaimer, the term of this patent is extended or adjusted under 35 U.S.C. 154(b) by 0 days.

(21) Appl. No.: 11/756,753

(22) Filed: Jun. 1, 2007

(51) Int. Cl.
*G05F 1/00* (2006.01)
(52) U.S. Cl. .................................... 323/222; 323/282
(58) Field of Classification Search ................ 323/222, 323/282
See application file for complete search history.

(56) References Cited

U.S. PATENT DOCUMENTS

| | | | |
|---|---|---|---|
| 4,761,722 A * | 8/1988 | Pruitt | 363/17 |
| 5,923,152 A * | 7/1999 | Guerrera | 323/222 |
| 7,075,277 B2 * | 7/2006 | Ishii et al. | 323/259 |
| 2007/0212765 A1 * | 9/2007 | Van Krieken | 435/139 |

* cited by examiner

*Primary Examiner*—Matthew V Nguyen
*Assistant Examiner*—Nguyen Tran

(57) ABSTRACT

A high efficiency single-inductor dual-control loop power converter (SIDL) is proposed for converting unregulated DC input into regulated DC output to a power load. The SIDL includes:

an energy storage loop having: a power inductor, a power capacitor and a power diode.

A PWM switching power regulating loop for converting the unregulated DC input into the regulated DC output.

a power-efficiency maximizing loop in parallel connection with the power diode.

The power-efficiency maximizing loop includes: a power shunt transistor in parallel connection with the power diode and a real-time control loop adjusting, in response to a free-wheeling current through the power diode, conductance of the power shunt transistor in a manner that a higher free-wheeling current results in a higher conductance of the power shunt transistor.

9 Claims, 9 Drawing Sheets

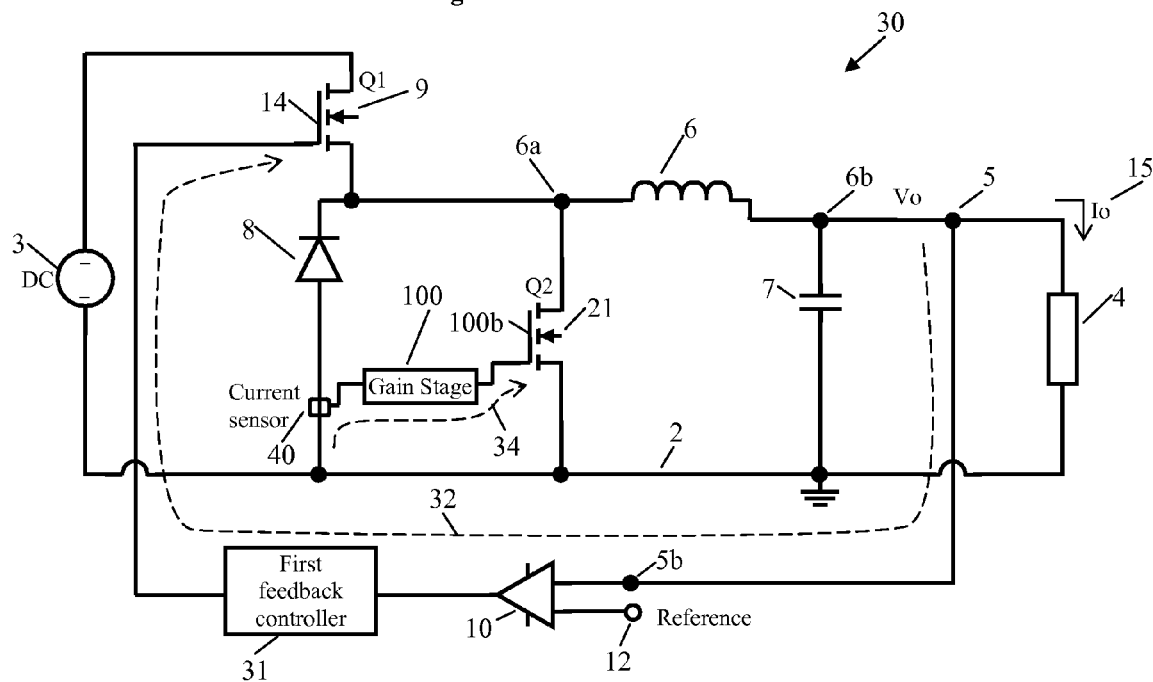
Fig. 3 Present Invention
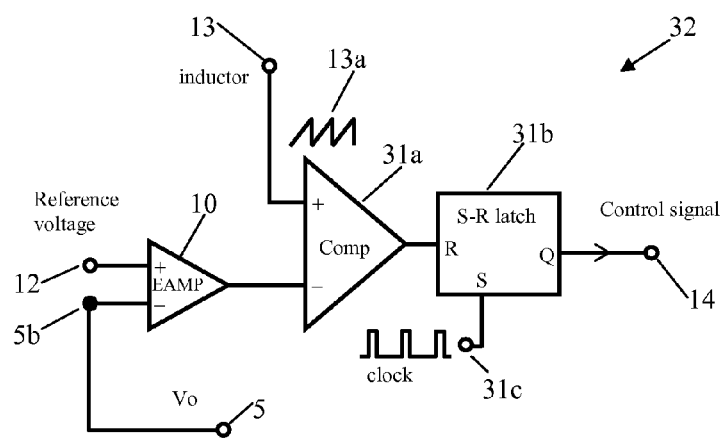
Fig. 4

HIGH EFFICIENCY SINGLE-INDUCTOR DUAL-CONTROL LOOP POWER CONVERTER

CROSS REFERENCE TO RELATED APPLICATIONS

Field of Invention

This invention relates generally to the field of electrical power supply. More specifically, the present invention is directed to the design of a switching power supply.

BACKGROUND OF THE INVENTION

Owing to its compact size, low weight and generally high efficiency, switching power supplies have enjoyed ever increasing market adoption in the consumer electronics industry. This is specially so in portable applications where compact size, low weight and battery life are all on top of the list of considerations.

As a first illustration of prior art switching power supply, FIG. 1 illustrates a non-synchronous, single-loop regulated switching converter 1. The single-loop regulated switching converter 1 operates to convert an unregulated DC input 3 into a regulated DC output voltage 5 supplying a power load 4 with power ground 2. A controlled power output transistor 9 drives the power load 4 through a series, parallel network of power inductor 6, power capacitor 7 and passive power diode 8 with the input side 6a of the power inductor 6 connected to the power output transistor 9 and the output side 6b connected to the power load 4. In this single-loop system, the control signal, being the gate voltage of the power output transistor 9, is derived from a feedback control branch having an error amplifier 10 and a pulse width modulation (PWM) controller 11 that turns on or off the power output transistor 9 depending upon the regulated DC output voltage 5 being lower or higher than a "reference" voltage. As the power inductor 6 stores electrical energy with its coil current, the passive power diode 8 free-wheels the inductor current whenever the power output transistor 9 is turned off.

FIG. 2A together with FIG. 2B illustrate a second prior art single-loop synchronous regulated switching converter 20 and some of its related operating signal waveforms. Except for the replacement of the power diode 8 in the single-loop regulated switching converter 1 with a power shunt transistor 21 and its driving inverter 22, the single-loop synchronous regulated switching converter 20 is essentially the same as the single-loop regulated switching converter 1. As the inverter 22 is driven by the output of the PWM controller 11, the single-loop synchronous regulated switching converter 20 operates on synchronously driving the power output transistor 9 and the power shunt transistor 21, in a complementary off/on manner, with the feedback control branch having the error amplifier 10 and the pulse width modulation (PWM) controller 11. This can be seen by comparing the two gate signal waveforms Vgs_Q1 20a and Vgs_Q2 20b of power output transistor 9 and power shunt transistor 21 respectively. To prevent a dangerous condition of shoot-through wherein both transistors 9 and 21 are conducting, a dead time t1 is provided wherein both transistors 9 and 21 are OFF (Ids_Q1 20c=Ids_Q2 20d=0) and a load current Io returns through a built-in parasitic diode (part of power shunt transistor 21, not shown) with forward voltage Vf. The corresponding energy loss is Vf*Io*t1. Additionally, there are energy losses during time intervals t2 and t3 wherein the power output transistor 9 is being switched OFF and the power shunt transistor 21 being switched ON respectively. Thus, the following total energy loss is incurred per switching cycle of the transistors 9 and 21:

$$ELC = \text{Energy loss per switching cycle} = 0.5*Vf*Io*(t2+t3)+Vf*Io*t1 \quad (1)$$

A highly important measure of performance of a power converter is its overall power efficiency defined as:

$$\text{overall power efficiency} = \text{output power}/\text{input power} \quad (2)$$

Clearly, the above ELC acts to undesirably lower the overall power efficiency of the single-loop synchronous regulated switching converter 20. As will be shown later, the loss of overall power efficiency becomes rapidly pronounced at lighter load current Io. Hence, a primary object of the present invention is to improve the overall power efficiency.

SUMMARY OF THE INVENTION

A high efficiency single-inductor dual-control loop power converter (SIDL) is proposed for converting unregulated DC input into regulated DC output to a power load. The SIDL includes:

an energy storage loop that itself includes: a power inductor having an input side and an output side with the output side in series connection to the power load; a power capacitor coupling the output side to a power ground; and a power diode bridging the input side to the power ground.

a first switching power regulating loop interposed between the unregulated DC input and the input side, for controllably converting the unregulated DC input into the regulated DC output while sensing a power regulation at the power load.

a second power-efficiency maximizing loop in parallel connection with the power diode for shunting a portion of its electrical current thus associated power loss so as to maximize the overall power efficiency of the SIDL regardless of the power level delivered to the power load.

In an embodiment, the switching power regulating loop employs a PWM control loop adjusting, in response to a sensed output at the power load, the turn-on time pulse width of a power output transistor that is in series connection with the power inductor.

In one embodiment, the regulated DC output is implemented as a regulated load voltage with the sensed output at the power load being the load voltage.

In an alternative embodiment, the regulated DC output is implemented as a regulated load current with the sensed output at the power load being the load current.

In an embodiment, the power-efficiency maximizing loop includes: a power shunt transistor in parallel connection with the power diode; and a real-time control loop adjusting, in response to a sensed freewheeling current through the power diode, conductance of the power shunt transistor in a manner that a higher sensed freewheeling current results in a higher conductance of the power shunt transistor. Furthermore, in response to a sensed freewheeling current of zero, the real-time control loop turns off the power shunt transistor for a corresponding transistor conductance of essentially zero.

In an embodiment, in response to any given level of sensed freewheeling current, the real-time control loop adjusts for just an adequate level of conductance of the power shunt transistor such that, beyond this adequate conductance level, a corresponding power loss attributable to driving the power shunt transistor itself would otherwise lower the overall power efficiency of the SIDL.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative.

FIG. 3 is a top level circuit architecture illustrating an embodiment of the single-inductor dual-control loop power converter of the present invention;

FIG. 4 is a circuit schematic illustrating an alternative of the first switching power regulating loop of the single-inductor dual-control loop power converter;

DETAILED DESCRIPTION OF SPECIFIC EMBODIMENTS

Figure 1:
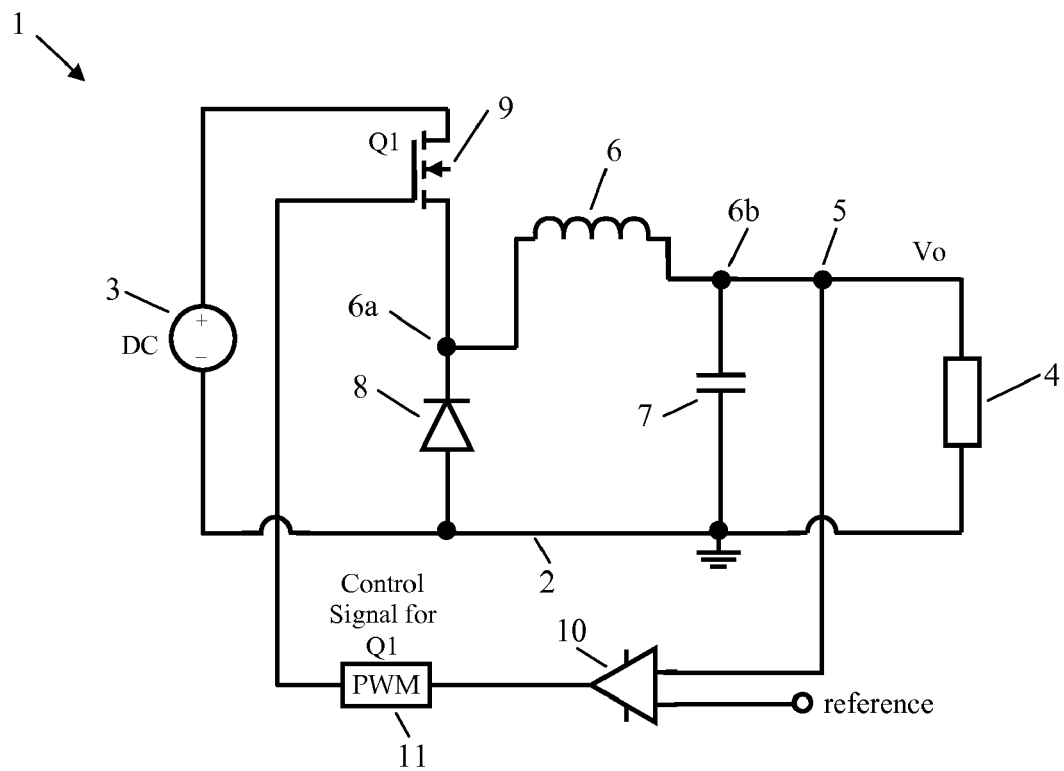
FIG. 1 illustrates a prior art non-synchronous, single-loop regulated switching converter.
Figure 2A:
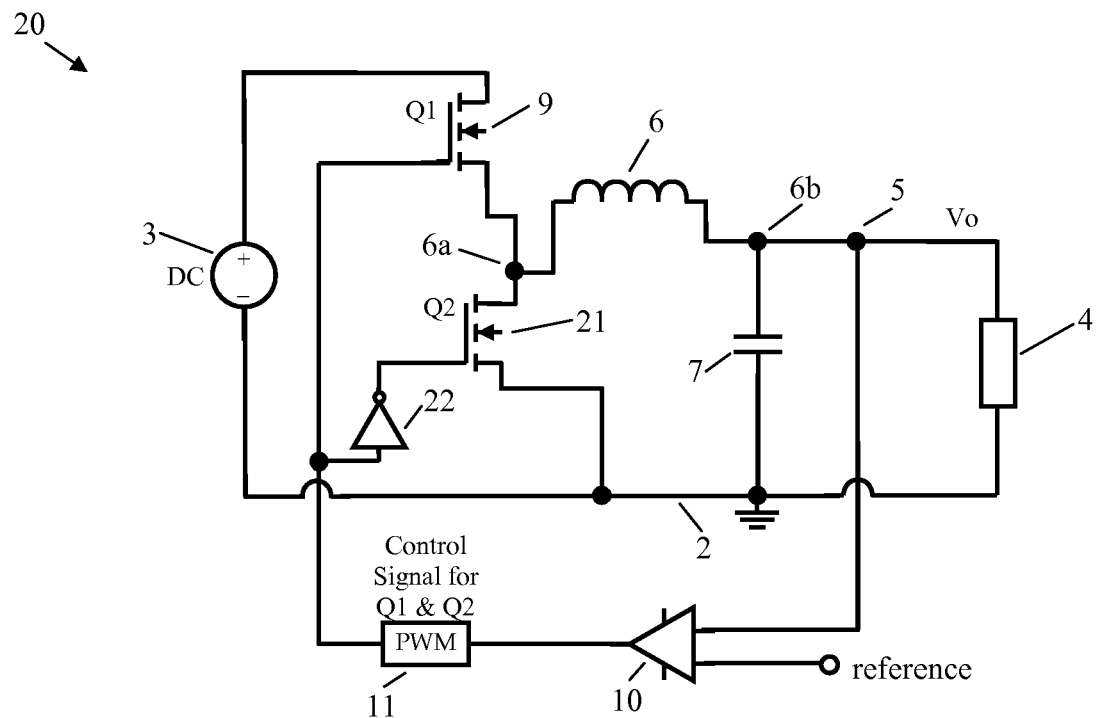
FIG. 2A together with FIG. 2B illustrate a second prior art single-loop synchronous regulated switching converter and some of its related operating signal waveforms.
Figure 2B:
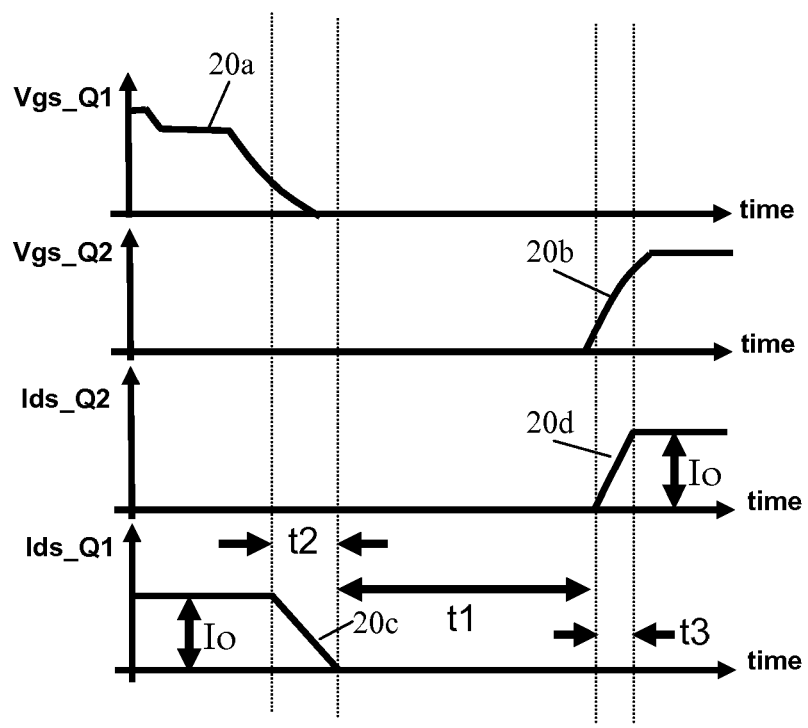

The description above and below plus the drawings contained herein merely focus on one or more currently preferred embodiments of the present invention and also describe some exemplary optional features and/or alternative embodiments. The description and drawings are presented for the purpose of illustration and, as such, are not limitations of the present invention. Thus, those of ordinary skill in the art would readily recognize variations, modifications, and alternatives. Such variations, modifications and alternatives should be understood to be also within the scope of the present invention.

FIG. 3 is a top level circuit architecture illustrating an embodiment of the single-inductor dual-control loop converter (SIDL) 30 of the present invention. As referenced to a power ground 2, the SIDL 30 converts an unregulated DC input 3 into a regulated DC output voltage 5 to a power load 4 with a load current Io 15. The output end of the SIDL 30 is an energy storage loop further including the following components:

a power inductor 6 having an input side 6a and an output side 6b with the output side 6b in series connection to the power load 4.

a power capacitor 7 coupling the output side 6b to the power ground 2.

a power diode 8 bridging the input side 6a to the power ground 2.

For controllably converting the unregulated DC input 3 into the regulated DC output voltage 5 while sensing a power regulation at the power load 4, a first switching power regulating loop 32 is interposed between the unregulated DC input 3 and the input side 6a. As shown, the switching power regulating loop 32 has a PWM control loop that is a series connection of an error amplifier 10, a first PWM feedback controller 31 and a power output transistor 9. A power shunt transistor 21 is provided in parallel connection with the energy storage loop to control power dissipation due to a freewheeling current through the power diode 8 that is caused by the load current Io 15 while the power output transistor 9 is shut off. As a component, the first PWM feedback controller 31 itself is known in the art and it drives the power output transistor 9 with a switching power control signal 14. The input of the first PWM feedback controller 31 is supplied by an output from the error amplifier 10 that produces an amplified signal representing the difference between a sensed output 5b and a desired reference voltage 12. Hence, the first PWM feedback controller 31 adjusts, in response to the sensed output 5b at the power load 4, the turn-on time pulse width of the power output transistor 9 in series connection with the power inductor 6 to maintain the regulated DC output voltage 5 within a desired range of regulation regardless of changes in the power load 4. In this embodiment, the regulated DC output is the regulated DC output voltage 5 thus; correspondingly, the sensed output 5b at the power load 4 is its load voltage. By now it should become clear to those skilled in the art that, with small modifications, the regulated DC output can alternatively be implemented as a regulated load current thus, correspondingly, the sensed output at the power load 4 will be its load current with the SIDL 30 delivering a regulated output current instead. This will be presently illustrated.

To control and minimize the aforementioned energy loss per switching cycle, ELC as given by expression (1), hence maximizing the overall power efficiency of the SIDL 30, a second power-efficiency maximizing loop 34 is introduced in parallel connection with the power diode 8. As shown, the power-efficiency maximizing loop 34 has a serial connection of a current sensor 40, a gain stage 100 and the power shunt transistor 21. The current sensor 40 provides a signal that is proportional to a current flowing through the power diode 8. Following the gain stage 100, a properly scaled signal, in proportion to the power diode current, is applied to the gate of the power shunt transistor 21 causing it to shunt a portion of the power diode freewheeling current thus power loss through it. Thus, in response to a higher sensed freewheeling current, the power-efficiency maximizing loop 34 adjusts for a higher conductance of the power shunt transistor 21. As the conductance of the power shunt transistor 21 can be controlled to become much higher than that of the power diode 8 and power dissipation is equal to $I^2R$ (from Ohm's Law), the corresponding ELC is reduced. On the other hand, the action of driving the gate of the power shunt transistor 21 has its own associated energy loss that is proportional to the square of the gate voltage. An excessive gate voltage applied to the power shunt transistor 21 would offset its power benefit derived from shunting a portion of the power diode freewheeling current. Therefore, the gain stage 100 needs to be properly set such that, in response to any given level of sensed freewheeling current through the power diode 8, the power-efficiency maximizing loop 34 adjusts for just an adequate level of conductance of the power shunt transistor 21 beyond which a corresponding power loss attributable to driving the power shunt transistor 21 itself would otherwise lower the overall power efficiency of the SIDL 30. As a corollary, in response to a sensed freewheeling current of zero through the power diode 8, the power-efficiency maximizing loop 34 turns off the power shunt transistor 21 for a corresponding transistor conductance of essentially zero. In this way, the overall power efficiency of the SIDL 30 can be maximized regardless of the power level delivered to the power load 4.

It is important to point out that the two switching power regulating loop 32 and power-efficiency maximizing loop 34 are, while operating simultaneously, totally different control loops because they sense different signals for making decision. As a result, the bandwidth (the responding time) of the two control loops are very different, as illustrated in the table below:

|  | Switching power regulating loop | Power-efficiency maximizing loop |
| --- | --- | --- |
| Sensed signal | Power load related signal | Current through power diode |
| Response time | Slow (PWM time) | Very Fast (real-time comparison) |

Also, as a pre-requisite for the power shunt transistor 21 to turn ON is current flowing through the power diode 8, the root-cause of shoot-through wherein both transistors 9 and 21 are conducting has been eliminated hence no more need to provide the dead time t1 as in the prior art.

FIG. 4 is a circuit schematic illustrating an alternative of the first switching power regulating loop 32 of the SIDL 30. A series connection of a comparator 31a and an S-R latch 31b follows the output of the error amplifier 10. The output of S-R latch 31b, clocked by a PWM clock 31c, then feeds the switching power control signal 14. Notice that signal I-inductor 13 (with an illustrated I-inductor waveform 13a), the other input of the comparator 31a, is a sensed signal representing current through the power inductor 6. Hence, this alternative of the first switching power regulating loop 32 implements a corresponding SIDL 30 delivering a regulated output current using a fixed frequency current mode PWM control.

Figure 5:
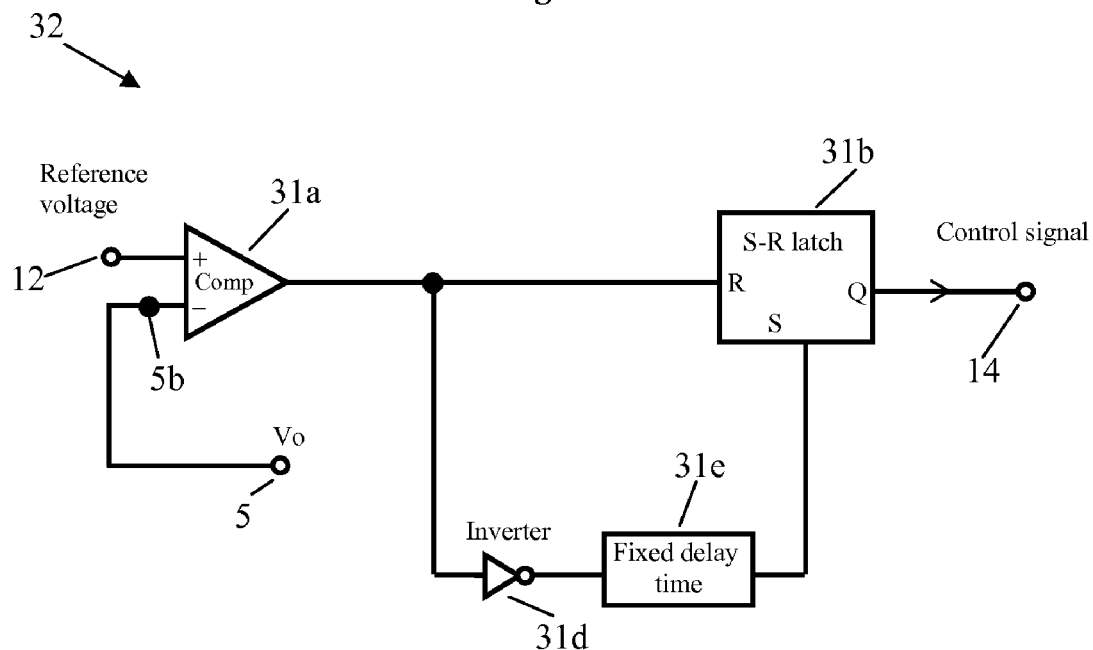
FIG. 5 is a circuit schematic illustrating an alternative embodiment of the first switching power regulating loop of the single-inductor dual-control loop power converter.

FIG. 5 is a circuit schematic illustrating another alternative embodiment of the first switching power regulating loop 32 of the SIDL 30. A series connection of an inverter 31d and a fixed delay time 31e follows the output of the comparator 31a that also feeds the R-terminal of the S-R latch 31b. As the inputs of the comparator 31a are the sensed output 5b (of regulated DC output voltage 5) and the reference voltage 12, this alternative of the first switching power regulating loop 32 implements a corresponding SIDL 30 delivering a regulated output voltage using a constant-off voltage mode PWM control.

Figure 6:
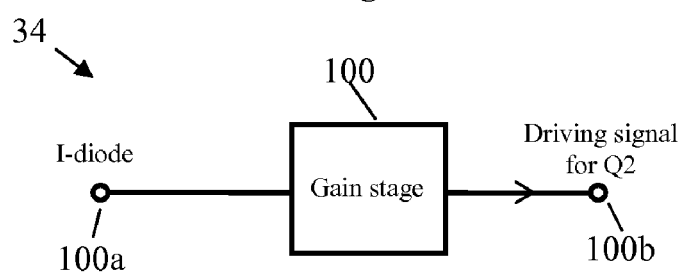
FIG. 6 is a high level circuit architecture illustrating an embodiment of the second power-efficiency maximizing loop.

FIG. 6 is a high level circuit architecture illustrating an embodiment of the second power-efficiency maximizing loop 34. As shown, the power-efficiency maximizing loop 34 has two key important components serially connected: an I-diode signal 100a, coming from the free-wheeling power diode current sensor 40, and the gain stage 100 that amplifies the I-diode signal 100a to an adequate level (power-efficiency control signal 100b) to drive the power shunt transistor 21.

Figure 7A:
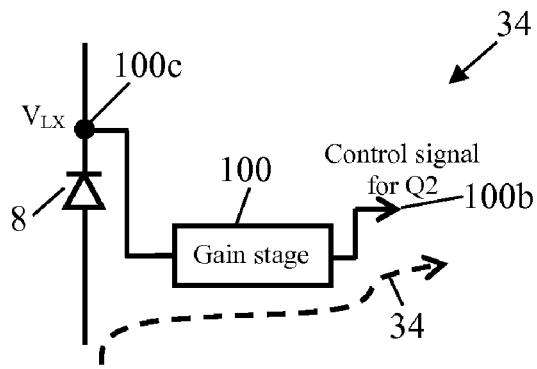
FIG. 7A to FIG. 7C illustrate various ways to measure free-wheeling diode current for the second power-efficiency maximizing loop of FIG. 6.
Figure 7B:
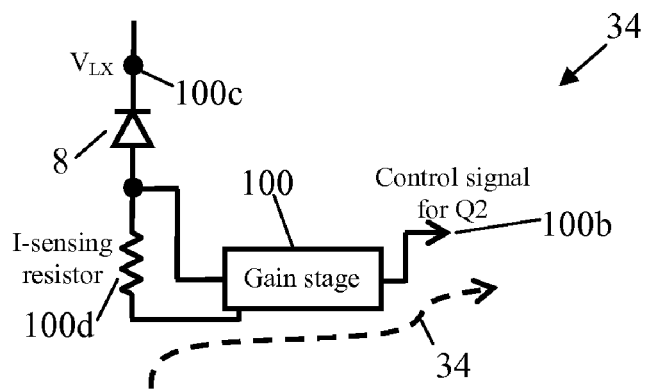
Figure 7C:
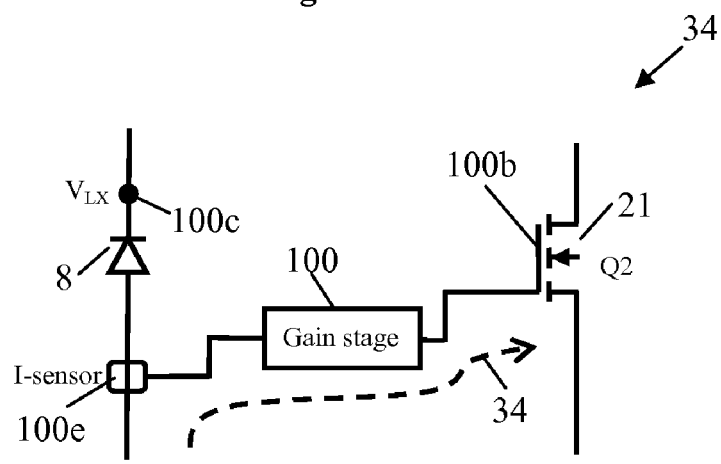

FIG. 7A to FIG. 7C illustrate various ways to measure the free-wheeling diode current for the second power-efficiency maximizing loop 34 of FIG. 6. In FIG. 7A a diode negative terminal voltage $V_{LX}$ 100c of the power diode 8 is measured. The measured diode negative terminal voltage $V_{LX}$ 100c can then be used in conjunction with a pre-determined diode current-voltage characteristics to estimate the free-wheeling diode current. In FIG. 7B an I-sensing resistor 100d of known value is placed in series connection with the power diode 8. A measured voltage drop across the I-sensing resistor 100d is then used to calculate the free-wheeling diode current. In FIG. 7C an I-sensor 100e can be placed in close proximity to the current path of the power diode 8 to directly sense the free-wheeling diode current. As a more specific embodiment, a Hall Effect device can be used as the I-sensor 100e. In any case, depending upon whether the sensed free-wheeling diode current is a current signal or a voltage signal, the corresponding gain stage 100 can be either a trans-conductance amplifier or a voltage amplifier.

Figure 8:
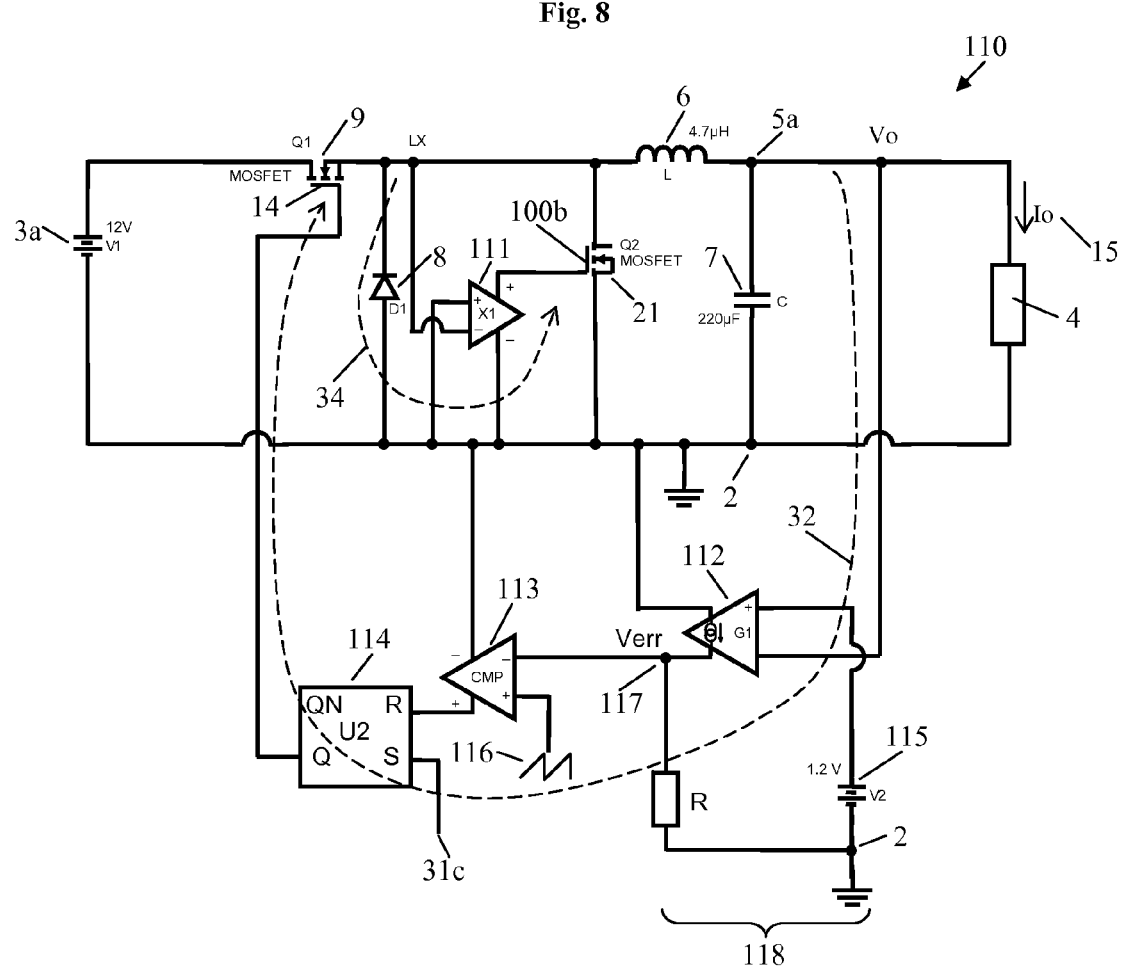
FIG. 8 is a detailed circuit schematic implementing the top level circuit architecture of FIG. 3.

FIG. 8 is a detailed SIDL circuit embodiment 110 implementing the top level circuit architecture of FIG. 3. The SIDL circuit embodiment 110 converts an unregulated 12V DC input V1 3a into a regulated 3.3V DC output voltage 5a driving a load current Io 15 into the power load 4. The switching power regulating loop 32 includes a cascade of a trans-conductance error amplifier G1 112, a voltage comparator CMP 113 and an RS latch U2 114 driving a switching power control signal 14 into the power output transistor 9. Thus, the RS latch U2 114 has a corresponding driving capability. The reference input of the trans-conductance error amplifier G1 112 is a precise voltage reference V2 115, in this case 1.2 Volt, that ultimately determines the final regulated 3.3V DC output voltage 5a. The trans-conductance error amplifier G1 112 produces an error current that is proportional to the voltage difference between the regulated 3.3V DC output voltage 5a and the precise voltage reference V2 115. A compensation network 118, having a resistor element R in parallel with the trans-conductance error amplifier G1 112, then converts the error current into an error signal Verr 117 feeding into a first input pf the voltage comparator CMP 113. A second input of the voltage comparator CMP 113 is a ramp signal 116 whose peak is higher than the error signal Verr 117. The ramp signal 116 can be an externally supplied voltage ramp or it can be generated by a current flowing through the power inductor L 6 or some combination of both. The output of the voltage comparator CMP 113 feeds the R-input of the RS latch U2 114. Finally, a PWM clock 31c supplies the S-input of the RS latch U2 114. The power-efficiency maximizing loop 34 includes an operational amplifier X1 111 amplifying, with limited gain and driving capability, a voltage drop across the power diode 8 into a power-efficiency control signal 100b driving the power shunt transistor 21.

Figure 9:
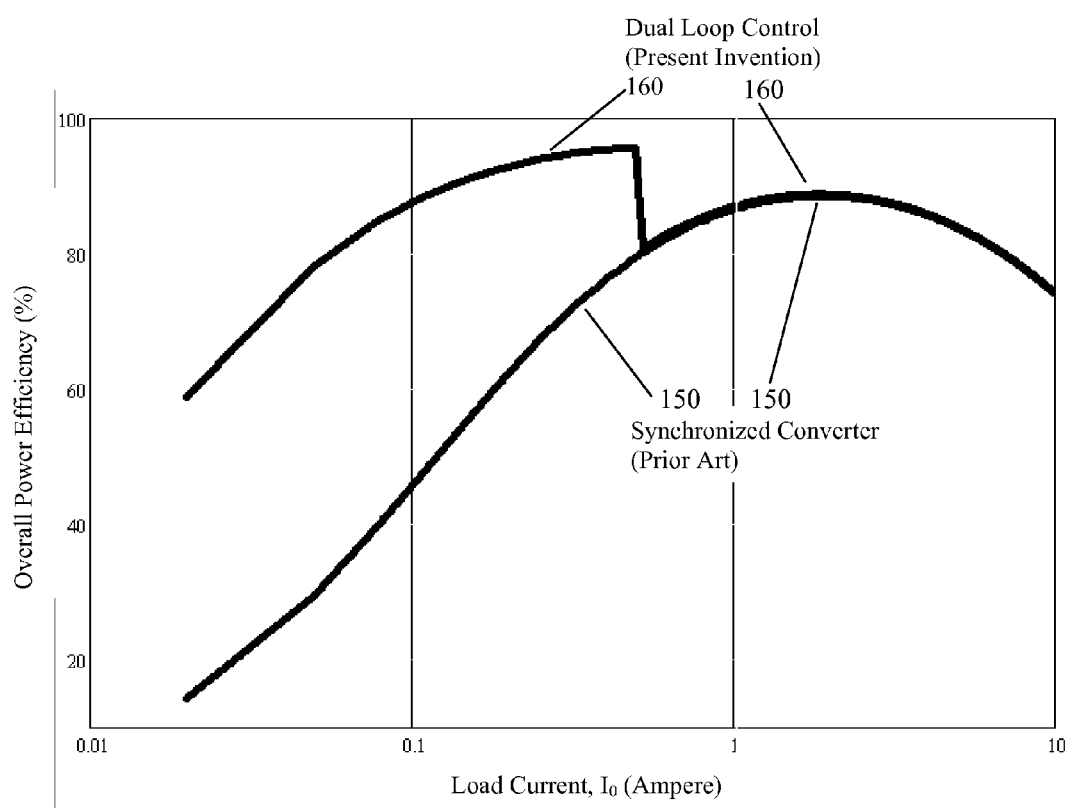
FIG. 9 compares the overall power efficiency between the single-inductor dual-control loop power converter and a prior art single-loop synchronous regulated switching converter.

FIG. 9 compares the overall power efficiency (%) between a single-inductor dual-control loop power converter, power efficiency 160, and a corresponding prior art single-loop synchronous regulated switching converter, power efficiency 150. Some relevant specific parameters are:

unregulated DC input 3a=12V, regulated DC output voltage 5a=3.3V, power inductor 6=3.7 μH (microHenry, $10^{-6}$ Henry)

While the overall power efficiency are close to each other under heavy load (Load current Io from 0.7 Amp to 10 Amp), the advantage of the single-inductor dual-control loop power converter over prior art becomes rapidly obvious toward light load, starting from about 0.7 Amp and below.

Figure 10A:
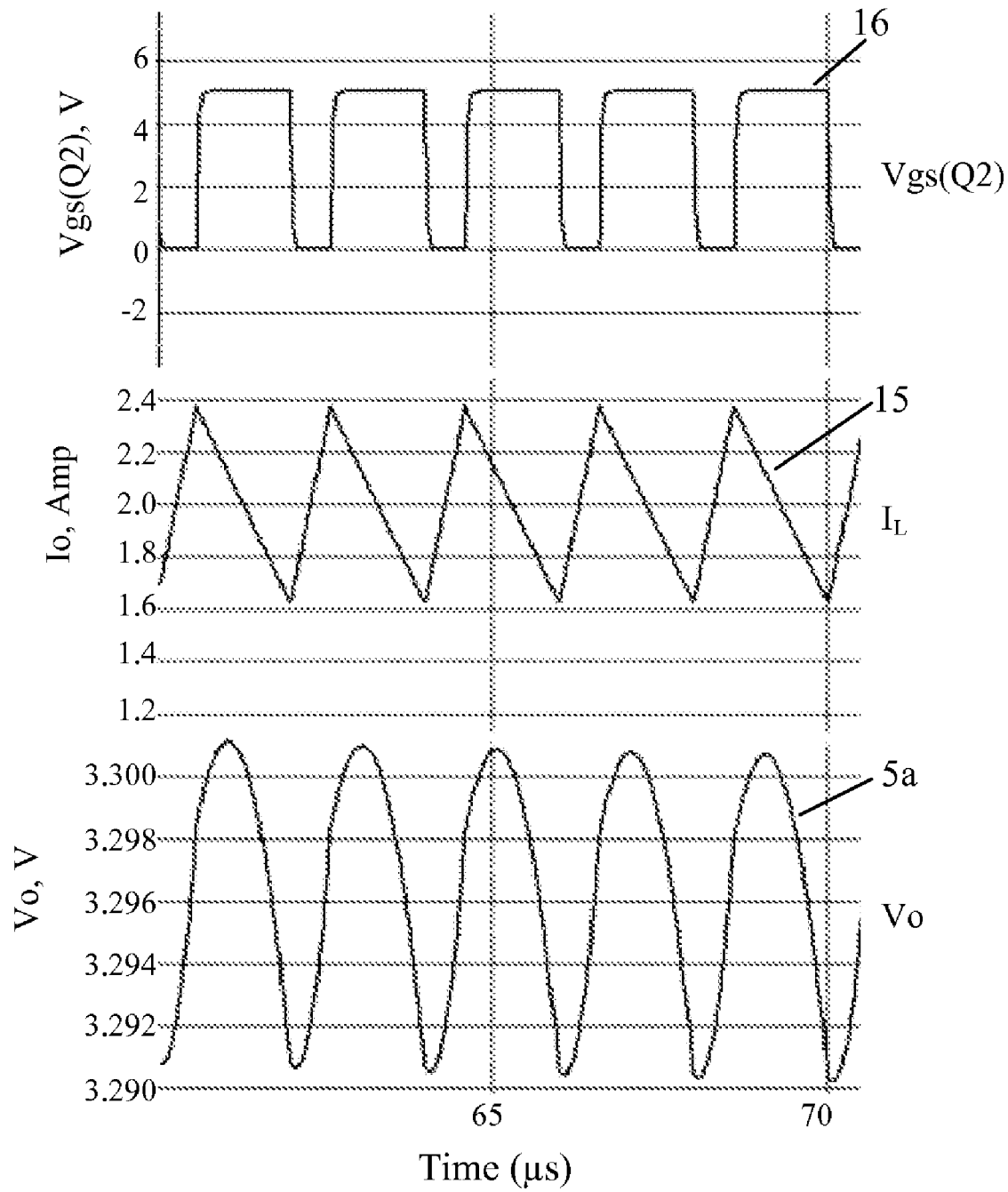
FIG. 10A illustrates various signal waveforms within the single-inductor dual-control loop power converter of FIG. 8 under a range of heavy load power level condition.
Figure 10B:
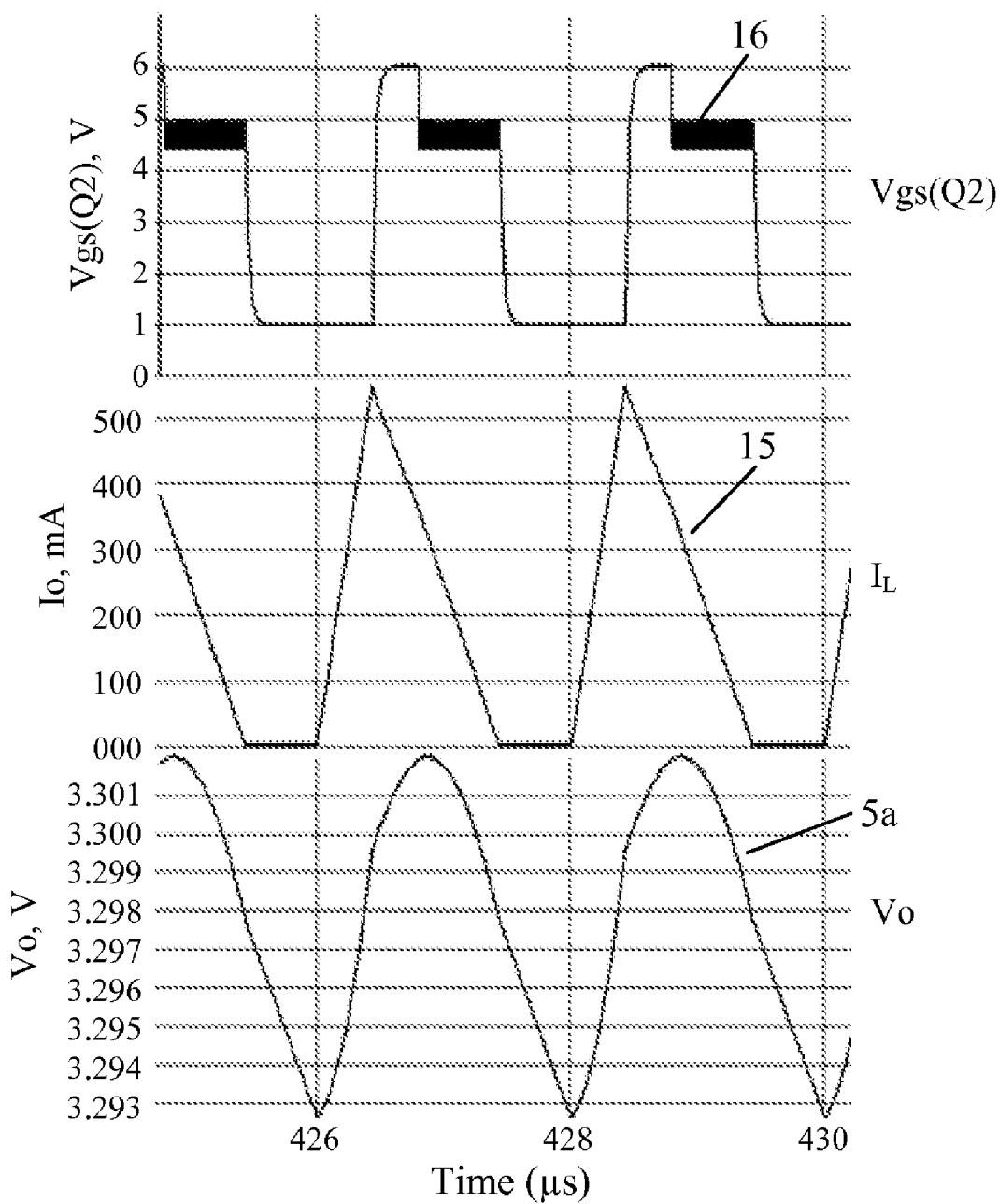
FIG. 10B illustrates various signal waveforms within the single-inductor dual-control loop power converter of FIG. 8 under a range of light load power level condition.

FIG. 10A illustrates various signal waveforms within the SIDL circuit embodiment 110 of FIG. 8 under a range of heavy load power level condition, Load current from about 1.6 Amp to about 2.4 Amp. The waveform power shunt transistor Vgs 16 looks to be approximately synchronous with respect to load current Io 15 and regulated 3.3V DC output voltage 5a. FIG. 10B illustrates various signal waveforms within the SIDL circuit embodiment 110 of FIG. 8 under a range of light load power level condition, Load current Io from 0 mA to about 550 mA. Due to the nature of dual-control loop of the present invention, the waveform power shunt transistor Vgs 16 has now become highly non-synchronous with respect to load current Io 15 and regulated 3.3V DC output voltage 5a resulting in the observed higher overall power efficiency compared to the prior art.

While the description above contains many specificities, these specificities should not be constructed as accordingly limiting the scope of the present invention but as merely providing illustrations of numerous presently preferred embodiments of this invention. For example, to those skilled in the art, while the present invention is illustrated using Metal-Oxide-Semiconductor Field Effect Transistor (MOSFET) to implement both power output transistor 9 and power shunt transistor 21, the present invention can be readily implemented using bipolar transistors or other equivalent 3-terminal active switching devices as well.

Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed are:

1. A high efficiency single-inductor dual-control loop power converter (SIDL) for converting, as referenced to a power ground, an unregulated DC input into a regulated DC output to a power load, the DSPC comprising:
   a first energy storage loop further comprising:
      a single power inductor having an input side and an output side with the output side in series connection to the power load;
      a power capacitor coupling the output side to the power ground; and
      a power diode bridging the input side to the power ground;
   a first switching power regulating means interposed between the unregulated DC input and the input side, for controllably converting the unregulated DC input into the regulated DC output while sensing a power regulation at the power load; and
   a second power-efficiency maximizing loop in parallel connection with the power diode, having no inductive component therein, for shunting a portion of an electrical current thus power loss through the power diode the power-efficiency maximizing loop further comprises:
      a power shunt transistor in parallel connection with the power diode; and
      a real-time control loop adjusting, in response to a sensed freewheeling current through the power diode, the conductance of the power shunt transistor
      whereby maximize the overall power efficiency of the SIDL regardless of the power level delivered to the power load.

2. The SIDL of claim 1 wherein the switching power regulating means further comprises a pulse width modulation (PWM) control loop adjusting, in response to a sensed output at the power load, the turn-on time pulse width of a power output transistor, being part of the PWM control loop, in series connection with the power inductor.

3. The SIDL of claim 2 wherein the regulated DC output is a regulated load voltage thus, correspondingly, the sensed output at the power load is the load voltage.

4. The SIDL of claim 2 wherein the regulated DC output is a regulated load current thus, correspondingly, the sensed output at the power load is the load current.

5. The SIDL of claim 2 wherein, in response to a higher sensed freewheeling current, the real-time control loop adjusts for a higher conductance of the power shunt transistor.

6. The SIDL of claim 5 wherein, in response to any given level of sensed freewheeling current, the real-time control loop adjusts for just an adequate level of conductance of the power shunt transistor such that, beyond said adequate conductance level, a corresponding power loss attributable to driving the power shunt transistor itself would otherwise lower the overall power efficiency of the DSPC.

7. The SIDL of claim 2 wherein, in response to a sensed freewheeling current of zero, the real-time control loop turns off the power shunt transistor for a corresponding transistor conductance of essentially zero.

8. The SIDL of claim 2 wherein said power output transistor is a bipolar transistor or a metal-oxide-semiconductor field effect transistor (MOSFET).

9. The SIDL of claim 2 wherein said power shunt transistor is a bipolar transistor or a metal-oxide-semiconductor field effect transistor (MOSFET).

* * * * *